(12) United States Patent
Chien et al.

(10) Patent No.: US 7,729,936 B2
(45) Date of Patent: Jun. 1, 2010

(54) SYSTEM AND METHOD FOR LOT PRIORITY ADJUSTMENT

(75) Inventors: Wen-Chi Chien, Houlong Township, Miaoli County (TW); Yu-Wen Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1777 days.

(21) Appl. No.: 10/850,242

(22) Filed: May 20, 2004

(65) Prior Publication Data

US 2005/0261921 A1 Nov. 24, 2005

(51) Int. Cl.
*G05B 19/418* (2006.01)
(52) U.S. Cl. ............... 705/8; 700/95; 700/99; 700/100; 700/101; 705/28
(58) Field of Classification Search ........... 700/95, 700/99–100; 705/8
See application file for complete search history.

(56) References Cited

U.S. PATENT DOCUMENTS

| | | | | |
|---|---|---|---|---|
| 5,818,716 | A * | 10/1998 | Chin et al. ............ | 700/100 |
| 5,826,238 | A * | 10/1998 | Chen et al. ............ | 705/8 |
| 5,841,677 | A * | 11/1998 | Yang et al. ............ | 702/176 |
| 6,243,612 | B1 * | 6/2001 | Rippenhagen et al. ... | 700/100 |
| 6,633,791 | B1 * | 10/2003 | Lo et al. .............. | 700/101 |
| 6,731,999 | B1 * | 5/2004 | Yang et al. ............ | 700/102 |
| 6,931,296 | B2 * | 8/2005 | Lin et al. ............. | 700/101 |
| 7,257,454 | B2 * | 8/2007 | Chien ................. | 700/101 |

OTHER PUBLICATIONS

Dabbas, R., Fowler, J., A new scheduling approach using combined dispatching criteria in wafer fabs, (2003) IEEE Transactions on Semiconductor Manufacturing, 16(3), 501-510.*
Dabbas, R., Chen, H., et al., A Combined Dispatching Criteria Approach to Scheduling Semiconductor Manufacturing Systems, New York: Apr. 2001. Computers & Industrial Engineering. vol. 39, Iss. 3,4; p. 307.*
Kim, Y-D, Kim, J-U, et al., Due-Date Based Scheduling and Control Policies in a Multiproduct Semiconductor Wafer Fabrication Facility, Feb. 1998, IEEE Transactions on Semiconductor Manufacturing, vol. 11, No. 1, pp. 155-164.*

* cited by examiner

*Primary Examiner*—Beth V Boswell
*Assistant Examiner*—Tiphany B Dickerson
(74) *Attorney, Agent, or Firm*—Thomas, Kayden, Horstemeyer & Risley

(57) ABSTRACT

A system and method for lot priority adjustment. The system includes a database, a calculation unit and an adjustment unit. The database stores at least a committed date for a lot, a throughput rate and a cycle time for respective route operations in a production line, and Work-In-Process (WIP) information of the production line. The calculation unit calculates an x-ratio for the lot on a target route operation according to a current time, the committed date and a remaining cycle time for the lot, calculates a lot weight for the lot according to current loading of a predetermined number of route operations subsequent to the target route operation, and calculates a weighted x-ratio according to the x-ratio and the lot weight. The adjustment unit adjusts a priority for the lot according to the weighted x-ratio.

10 Claims, 6 Drawing Sheets

SYSTEM AND METHOD FOR LOT PRIORITY ADJUSTMENT

BACKGROUND

The present invention relates to production management, and more particularly to a system and method capable of dynamically adjusting lot priority.

Supply chain performs the functions of purchase of materials, transformation of these materials into intermediate and finished products, and distribution of these finished products to customers. The supply of services is in many ways similar to the supply of products. To strengthen competitiveness, supply chain management has become an important issue to meet the goals of reduced inventory and increased productivity, and particularly to enhance service quality.

On-time delivery is critical to successful supply chain management, that is, it is necessary to closely and carefully monitor the lot processing progress in order to achieve the goal. Currently, a manufacturing department sets different targets for respective lots everyday, and these daily targets must be accomplished to ensure on-time delivery. According to the daily targets, supervisors are concerned with the lot processing progress, and collect related information from different sources, such as product databases, planning systems, manufacturing execution systems, and others to determine whether those targets have been fulfilled. If the rate of progress of a lot falls behind its target, supervisors must manually survey all related lots and properly adjust the lot priority in order to meet the desired target. Since there is no mechanism to automatically and dynamically adjust lot processing priority, however, manual surveying is inefficient in gathering related information.

Additionally, conventional adjustment ignores production variance between the relative operation completion times between lots. Thus, the inevitable production variance between lots adds to the difficulty of achieving an optimized distribution of Work-In-Process (i.e., the lots) over the entire production schedule, resulting in short supply of some specific lots, particularly lots with low priority, and resulting failure of on-time delivery.

SUMMARY

The present invention is proposed to address and solve the aforementioned issues. It is understood that the present invention is applicable to any factory, service supplier and product.

Accordingly, it is therefore an object of the present invention to provide a system and method for lot priority adjustment that considers production variance.

To achieve the above object, the present invention provides a system and method for lot priority adjustment. According to one embodiment of the invention, the system includes a database, a calculation unit and an adjustment unit. The database stores at least a committed date for a lot, a throughput rate and a cycle time for respective route operations in a production line, and WIP information of the production line. The calculation unit calculates an x-ratio for the lot on a target route operation according to a current time, the committed date and a remaining cycle time for the lot, calculates a lot weight for the lot according to current loading of a predetermined number of route operations subsequent to the target route operation, and calculates a weighted x-ratio according to the x-ratio and the lot weight. The adjustment unit adjusts a priority for the lot according to the weighted x-ratio.

The adjustment unit further adjusts the priority for the lot according to the range of the weighted x-ratio. The adjustment unit further sorts all lots in the production line according to corresponding weighted x-ratio, and adjusts the priority for the lot according to the rank of the lot.

The adjustment unit further adjusts the priority for the lot according to technology type of the lot.

According to another embodiment of the invention, the method for lot priority adjustment is provided. First, an x-ratio for a lot on a target route operation is calculated according to a current time, a committed date and a remaining cycle time for the lot. Then, a lot weight for the lot is calculated according to current loading of a predetermined number of route operations subsequent to the target route operation. Then, a weighted x-ratio is calculated according to the x-ratio and the lot weight. Thereafter, a priority for the lot is adjusted according to the weighted x-ratio.

The priority for the lot is further adjusted according to the range of the weighted x-ratio. All lots in the production line are further sorted according to corresponding weighted x-ratio, and the priority for the lot is further adjusted according to the rank of the lot.

The priority for the lot is further adjusted according to technology type of the lot.

The above-mentioned method may take the form of program code embodied in a tangible media. When the program code is loaded into and executed by a machine, the machine becomes an apparatus for practicing the invention.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

Figure 1:
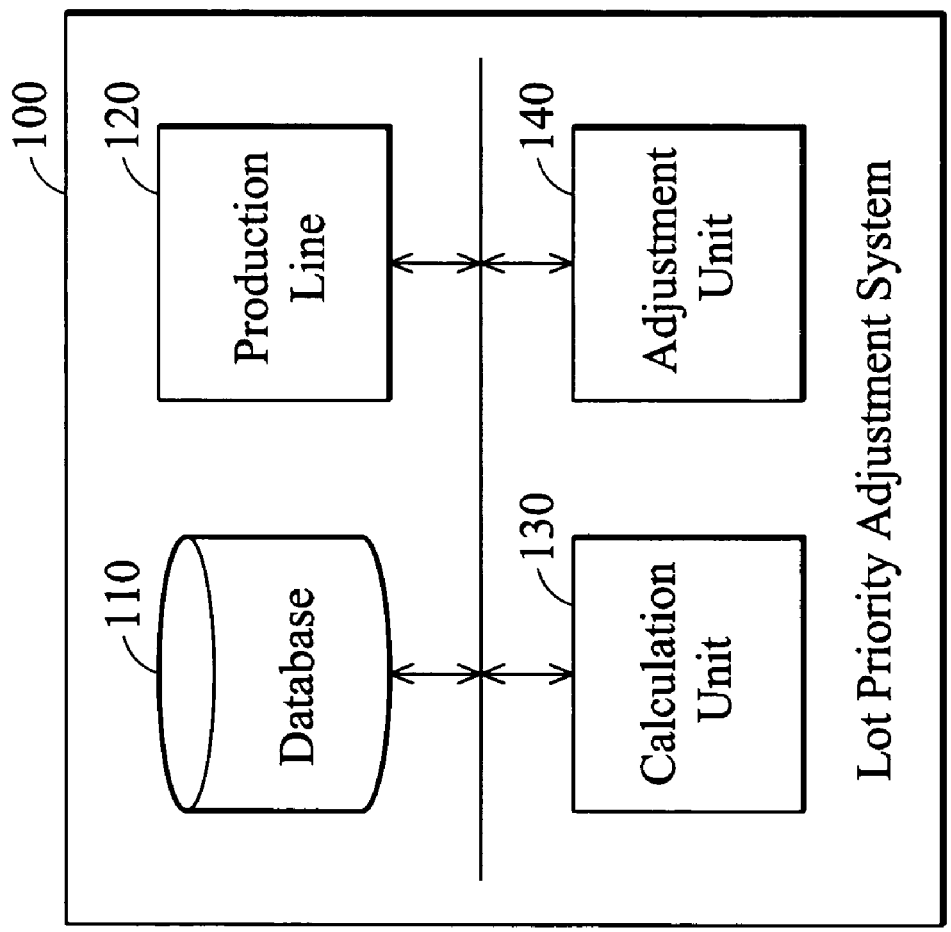
FIG. 1 is a schematic diagram illustrating the architecture of the lot priority adjustment system according to the present invention.

FIG. 1 is a schematic diagram illustrating the architecture of the lot priority adjustment system according to the present invention.

The lot priority adjustment system 100 according to the embodiment of the present invention includes a database 110, a production line 120, a calculation unit 130 and an adjustment unit 140. The production line 120 has a plurality of stages, each comprising at least one tool. The database 110 stores information used by the calculation unit 130, such as the priority and committed date for a respective lot, the throughput rate and cycle time for respective route operations in the production line 120, and WIP information of the production line 120. The committed date is determined by production control personnel to commit clients to the fabrication out date, wherein corresponding lots can be completed on the determined date. The committed date can be changed to a best effort date designed for the manufacturing department to forecast the best fabrication out date for the delayed lots. If some lots need be pushed or delayed, the committed date can be changed as the best effort date. It is understood that the database 110 may couple to the supply chain management system comprising MES (Manufacturing Execution System), planning system, product database, and others.

The calculation unit 130 calculates an x-ratio and a lot weight for a respective lot on a specific target route operation, and calculates a weighted x-ratio accordingly for lot priority adjustment. It is understood that a route can be predefined for each product in fabrication. The route may include a plurality of route operations comprising at least one tool groups, and each tool group comprises at least one tool. Detailed operation of the calculation unit 130 will be discussed later.

Figure 2:
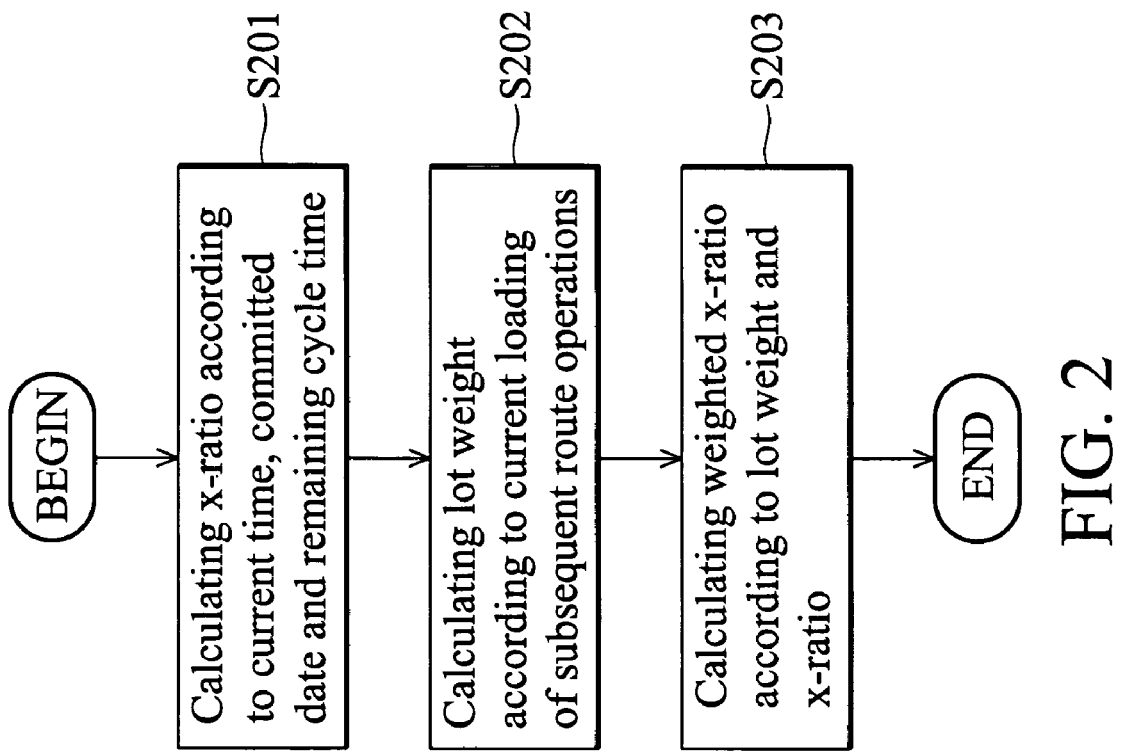
FIG. 2 is a flowchart showing the operation of the calculation unit according to the present invention.
Figure 3:
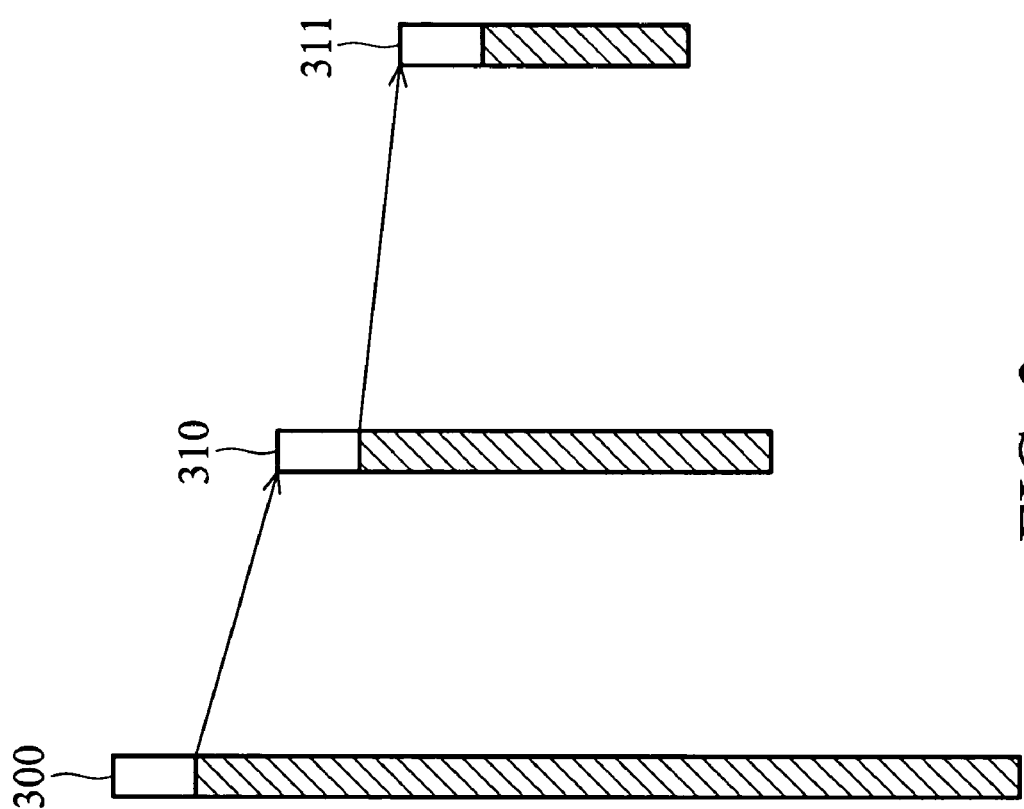
FIG. 3 shows a production route of a lot.

FIG. 2 shows the operation of the calculation unit 130 according to the present invention. First, in step S201, the calculation unit 130 calculates an x-ratio for a lot on a target route operation according to the current time, the committed date and a remaining cycle time for the lot using formula (1).

$$x-\text{ratio} = \frac{CD - CuT}{RCT}, \quad (1)$$

wherein CD is the committed date, CuT is the current time representing the system execution time from operating system, and RCT is the remaining cycle time for the lot. The remaining cycle time is the summation of the cycle time of route operations that the lot has not been processed thereon before fabrication out. It is noted that the remaining cycle time must sum up the cycle time of route operations in at least one parent route of a sub-route and that in the sub-route if the target route operation is in the sub-route. FIG. 3 shows a production route of a lot. As shown in FIG. 3, the lot is produced on a main route 300, jumped to a sub-route 310, and jumped to another sub-route 311 of the sub-route 310. In this case, the remaining cycle time includes the cycle time of the sub-route 311, sub-route 310, and main route 300 that has not been passed (dotted part).

Then, in step S202, the calculation unit 130 calculates a lot weight LW for the lot according to current loading of a predetermined number of route operations subsequent to the target route operation using formula (2), in which the total cycle time of the subsequent route operations is within a period P.

$$LW = \sum_{i=1}^{n} \omega_i \times \frac{CL(t_i)}{CT(t_i)}, \quad (2)$$

wherein LW is the lot weight, n is the predetermined number of route operations subsequent to the target route operation, $\omega_i$ is the weight for route operation i, $CL(t_i)$ is the current loading of route operation i, and $CT(t_i)$ is the cycle time for route operation i. The cycle time of each route operation can be retrieved from the database 110. It is understood that if $CL(t_i) > CT(t_i)$, it means route operation i is busy and a large amount of lots are wait thereon.

The weight $\omega_i$ for route operation i is defined as follows:

$$\omega_i = \frac{\left(P - \sum_{j=1}^{i} CT(t_j)\right)}{\sum_{i=1}^{n}\left(P - \sum_{m=1}^{k} CT(t_m)\right)}, \quad (3)$$

wherein $\omega_i$ is the weight for the route operation i, n is the predetermined number of route operations subsequent to the target route operation, and P is a period including the total cycle time of the route operations 1 to n. As shown in formula (3), the weight for the route operation closest to the target route operation is greater than that for other route operations.

The current loading of route operation i is defined as follows:

$$CL(t_i) = \frac{WIP(t_i)}{WPH(t_i)}, \quad (4)$$

wherein $CL(t_i)$ is the current loading of route operation i, $WIP(t_i)$ is the WIP quantity on route operation i, and $WPH(t_i)$ is the real-time throughput rate of route operation i. It is understood that the WIP information and the throughput rate of each route operation can be retrieved from the database 110.

Thereafter, in step S203, the calculation unit 130 calculates a weighted x-ratio according to the x-ratio and the lot weight LW using formula (5).

$$w\_x-\text{ratio} = x-\text{ratio} \times LW. \quad (5)$$

Figure 4:
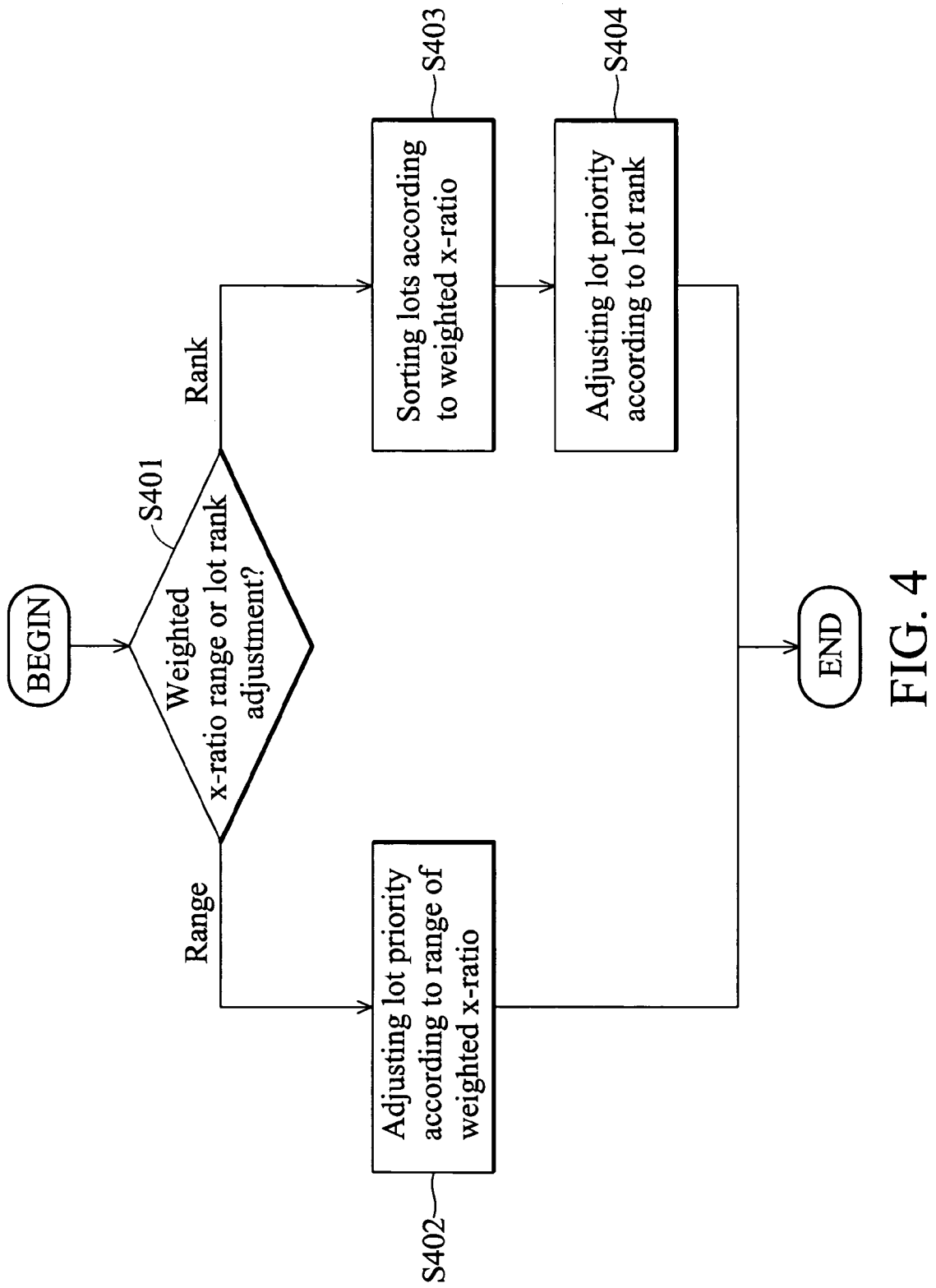
FIG. 4 a flowchart showing the operation of the adjustment unit according to the present invention.

FIG. 4 shows the operation of the adjustment unit 140 according to the present invention. First, in step S401, it is determined whether the adjustment is desired to perform according to the range of the weighted x-ratio or the rank of the lot. If weighted x-ratio range adjustment is adopted, in step S402, the adjustment unit 140 adjusts the priority for the lot according to the range of the weighted x-ratio and a predetermined mapping table. It is noted that the technology type of the lot can be also considered with the weighted x-ratio for lot priority adjustment. If lot rank adjustment is adopted, in step S403, the adjustment unit 140 sorts all lots in the production line 120 according to corresponding weighted x-ratio, and in step S404, adjusts the priority for the lot according to the rank of the lot. It is understood that a percentage target is defined by the production control personnel or supervisors. The percentage target may include several intervals, each of which has a corresponding priority class. Additionally, the calculation unit 130 may collect related data from the database 110, calculate the percentage distribution of WIPs in the production line 120, and display the result on an interface (not shown) or report to related supervisors. After the lot priority adjustment, the adjusted priority can be set into a production system, such as a MES, and the production line may follow the adjusted priority to produce the lot.

Figure 5:
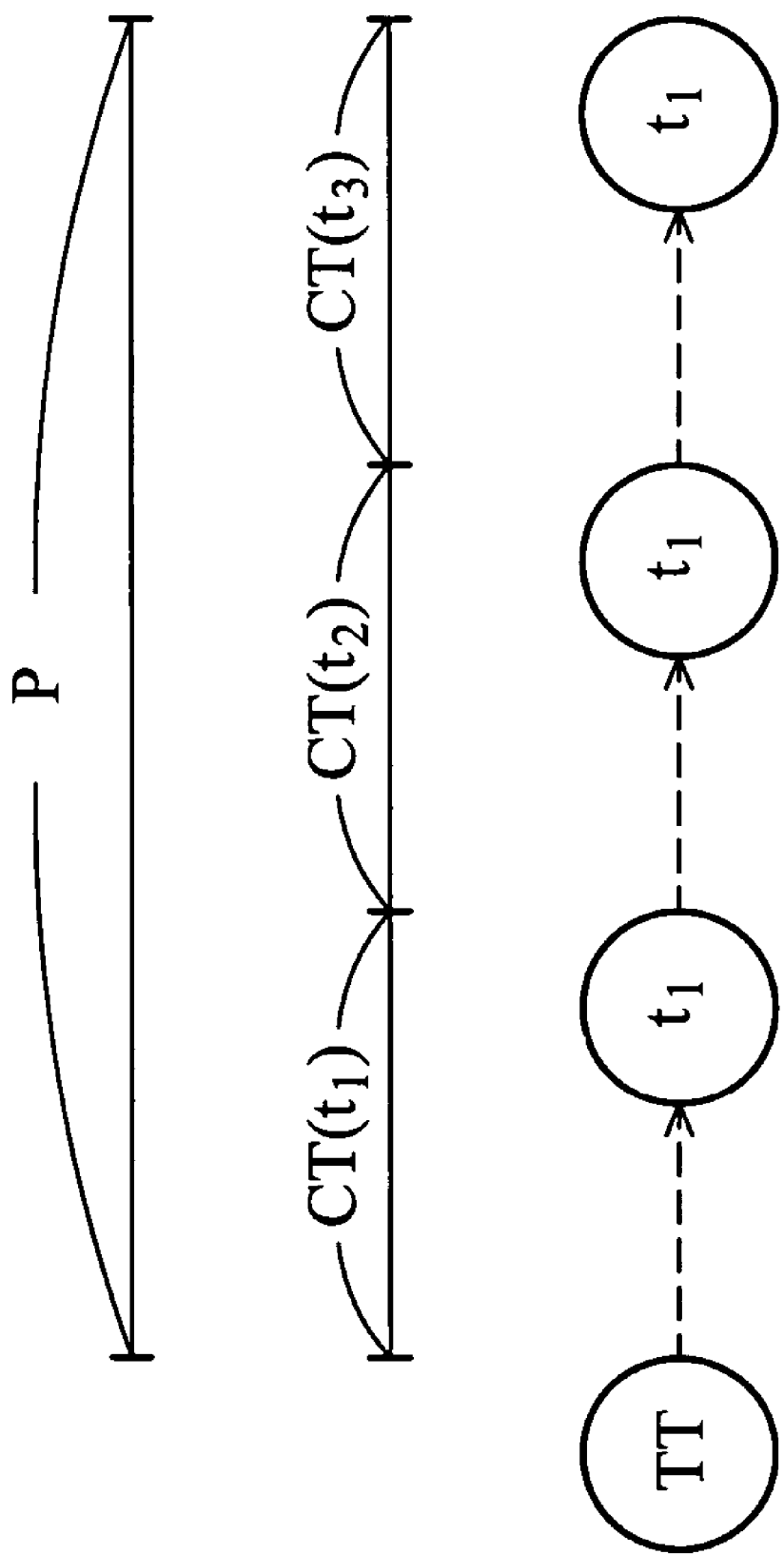
FIG. 5 is an example of lot priority adjustment according to the present invention.

FIG. 5 is an example of lot priority adjustment according to the present invention. In the example, a lot with 0.13 um technology is on target route operation TT, and the original lot priority is "Medium". The remaining cycle time is 10 days, and there are 9 days until the committed date. The period P is 8 hours, and the cycle time $CT(t_1)$, $CT(t_2)$ and $CT(t_3)$ for route operations $t_1$, $t_2$ and $t_3$ is 4, 2 and 1.5 hours, respectively. At this time, the current loading $CL(t_1)$, $CL(t_2)$ and $CL(t_3)$ of route operations $t_1$, $t_2$ and $t_3$ is 5, 8 and 3, respectively. It is understood that only route operations $t_1$, $t_2$ and $t_3$ are considered in the example since the total cycle time of route operations $t_1$, $t_2$ and $t_3$ is within the period P.

Using formula (1), the x-ratio of the lot is 9/10=0.9. According to formula (3), the weight $\omega_1$, $\omega_2$ and $\omega_3$ for route operations $t_1$, $t_2$ and $t_3$ is calculated as 4/6.5, 2/6.5 and 0.5/6.5, respectively. Using formula (2), the lot weight for the lot on the target route operation is calculated as follows:

$$LW = \sum_{i=1}^{n} \omega_i \times \frac{CL(t_i)}{CT(t_i)} = \left(\frac{4}{6.5} \times \frac{5}{4}\right) + \left(\frac{2}{6.5} \times \frac{8}{2}\right) + \left(\frac{0.5}{6.5} \times \frac{3}{1.5}\right) = 2.15.$$

Therefore, the weighted x-ratio w_x-ratio is x-ratio× LW=0.9×2.15=1.935.

Table 1 shows an example of a priority mapping table.

TABLE 1

| Technology | SuperHotRun | HotRun | Medium | Slow | SuperSlow |
|---|---|---|---|---|---|
| 0.13 | 0~2.0 | 2.0~3.0 | 3.0~4.0 | 4.0~5.5 | >5.5 |
| 0.15 | 0~1.8 | 1.8~2.8 | 2.8~3.5 | 3.5~5.2 | >5.2 |
| 0.18 | 0~1.5 | 1.5~2.5 | 2.5~3.3 | 3.3~5.0 | >5.0 |
| Percentage Target | 5% | 10% | 20% | 60% | 5% |

According to the mapping table, if weighted x-ratio range adjustment is adopted, the priority for the lot is adjusted to be "SuperHotRun" since the lot technology is 0.13 um and the weighted x-ratio is 1.935. If lot rank adjustment is adopted, all of the lots are first sorted according to their corresponding weighted x-ratios. If the lot is not ranked in top 5%, but is within the next 10%, its priority is set to "HotRun".

Figure 6:
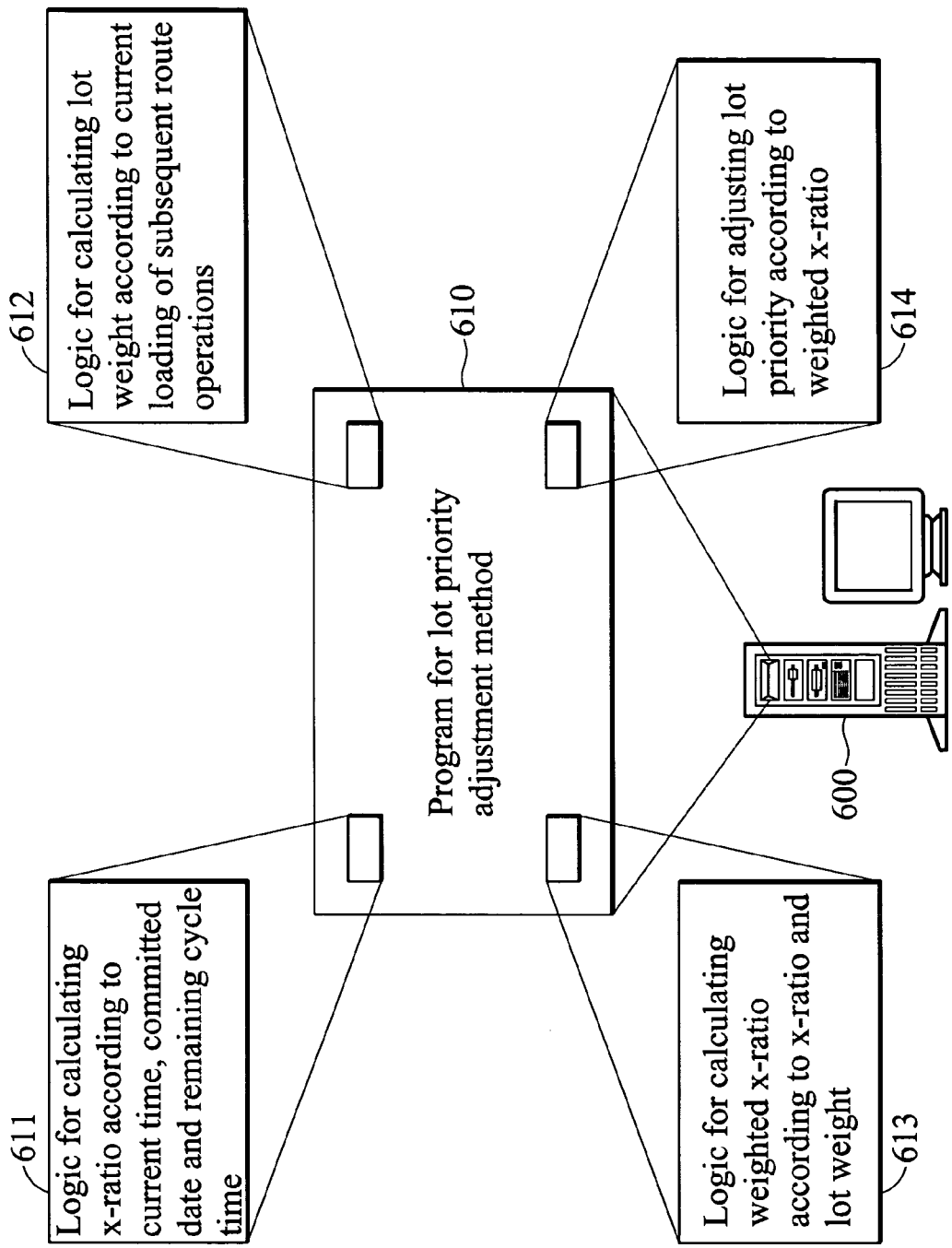
FIG. 6 is a schematic diagram illustrating a storage medium for storing a computer program for execution of the lot priority adjustment method according to the present invention.

FIG. 6 is a diagram of a storage medium for storing a computer program providing the lot priority adjustment method according to the present invention. The computer program product comprises a storage medium 610 having computer readable program code embodied in the medium for use in a computer system 600, the computer readable program code comprises at least computer readable program code 611 calculating an x-ratio for a lot on a target route operation according to a current time, a committed date and a remaining cycle time for the lot, computer readable program code 612 calculating a lot weight for the lot according to current loading of a predetermined number of route operations subsequent to the target route operation, computer readable program code 613 calculating a weighted x-ratio according to the x-ratio and the lot weight, and computer readable program code 614 adjusting the priority for the lot according to the weighted x-ratio.

The present invention thus provides a system and method that automatically monitors lot processing progress in the production line, and dynamically adjusts lot priority with consideration of production variances, such that the daily target of each lot can be ensured, and on-time delivery can be also achieved.

The method and system of the present invention, or certain aspects or portions thereof, may take the form of program code (i.e., executable instructions) embodied on tangible media, such as floppy diskettes, CD-ROMS, hard drives, or any other machine-readable storage medium, wherein, when the program code is loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in the art can still make various alterations and modifications without departing from the scope and spirit of this invention. Therefore, the scope of the present invention shall be defined and protected by the following claims and their equivalents.

What is claimed is:

1. A computer-implemented method for lot priority adjustment for use in a computer including a calculation unit, and an adjustment unit, wherein the computer is programmed to perform the steps of:

receiving a throughput rate and a cycle time for respective route operations in a production line, and Work-In-Process (WIP) information of the production line from the production line by the calculating unit;

calculating an x-ratio for a lot on a target route operation according to a current time, a committed date and a remaining cycle time for the lot by the calculating unit;

calculating a lot weight for the lot according to current loading of a predetermined number of route operations subsequent to the target route operation by the calculating unit, wherein the current loading of the predetermined number of the route operations subsequent to the target route operation is derived from the WIP information of the production, and the lot weight is calculated as follows:

$$LW = \sum_{i=1}^{n} \omega_i \times \frac{CL(t_i)}{CT(t_i)},$$

wherein LW is the lot weight, n is the predetermined number of route operations subsequent to the target route operation, $\omega_i$ is the weight for route operation i, $CL(t_i)$ is the current loading of route operation i, and $CT(t_i)$ is the cycle time for route operation i, and the weight for route operation i is defined as follows:

$$\omega_i = \frac{\left(P - \sum_{j=1}^{i} CT(t_j)\right)}{\sum_{k=1}^{n} \left(P - \sum_{m=1}^{k} CT(t_m)\right)},$$

wherein P is a period including the total cycle time of the route operations 1 to n subsequent to the target route operation;

calculating a weighted x-ratio according to the x-ratio and the lot weight by the calculating unit;

transmitting the weighted x-ratio to the adjustment unit by the calculating unit; and adjusting a priority for the lot according to the weighted x-ratio by the adjustment unit.

2. The method of claim 1 wherein the x-ratio is defined as follows:

$$x-\text{ratio} = \frac{CD - CuT}{RCT},$$

wherein CD is the committed date, CUT is the current time, and ROT is the remaining cycle time.

3. The method of claim 2 further comprising calculating the remaining cycle time for the lot by summation of the cycle time of route operations that the lot has not yet been processed by the calculating unit.

4. The method of claim 3 further comprising summing up cycle time of route operations in at least one parent route of a sub-route and that in the sub-route if the target route operation is in the sub-route by the calculating unit.

5. The method of claim 1 wherein the current loading of route operation i is defined as follows:

$$CL(t_i) = \frac{WIP(t_i)}{WPH(t_i)},$$

wherein $CL(t_i)$ is the current loading of route operation i, $WIP(t_i)$ is the WIP quantity on route operation i, and $WPH(t_i)$ is the throughput rate of route operation i.

6. The method of claim 1 further comprising calculating the weighted x-ratio by multiplication of the x-ratio by the lot weight by the calculating unit.

7. The method of claim 1 further comprising adjusting the priority for the lot according to the range of the weighted x-ratio by the adjustment unit.

8. The method of claim 1 further comprising sorting all of lots in the production line according to corresponding weighted x-ratio by the adjustment unit, and adjusting the priority for the lot according to the rank of the lot by the adjustment unit.

9. The method of claim 1 further comprising adjusting the priority for the lot according to technology type of the lot by the adjustment unit.

10. A machine-readable storage medium storing a computer program which, when executed, directs a computer to perform a method for lot priority adjustment, comprising the steps of:
calculating an x-ratio for a lot on a target route operation according to a current time, a committed date and a remaining cycle time for the lot;
calculating a lot weight for the lot according to current loading of a predetermined number of route operations subsequent to the target route operation, wherein the lot weight is calculated based on the defined as follows:

$$LW = \sum_{i=1}^{n} \omega_i \times \frac{CL(t_i)}{CT(t_i)},$$

wherein LW is the lot weight, n is the predetermined number of route operations subsequent to the target route operation, $\omega_i$ is the weight for route operation i, $CL(t_i)$ is the current loading of route operation i, and $CT(t_i)$ is the cycle time for route operation i, and the weight for route operation i is defined as follows:

$$\omega_i = \frac{\left(P - \sum_{j=1}^{i} CT(t_j)\right)}{\sum_{i=1}^{n}\left(P - \sum_{m=1}^{k} CT(t_m)\right)},$$

wherein P is a period including the total cycle time of the route operations 1 to n subsequent to the target route operation;
calculating a weighted x-ratio according to the x-ratio and the lot weight; and adjusting a priority for the lot according to the weighted x-ratio.

* * * * *